United States Patent [19]
Feldman

[11] Patent Number: 5,343,519
[45] Date of Patent: Aug. 30, 1994

[54] AUTODIALER WITH PIN FEATURE

[76] Inventor: Peter Feldman, 254 W. 103 St., New York, N.Y. 10025

[21] Appl. No.: 117,893

[22] Filed: Sep. 7, 1993

[51] Int. Cl.$^5$ .......................... H04M 1/00; H04M 1/26
[52] U.S. Cl. ...................................... 379/355; 379/354
[58] Field of Search ......................... 379/354, 355, 357

[56] References Cited

U.S. PATENT DOCUMENTS

| | | | |
|---|---|---|---|
| 4,126,768 | 11/1978 | Grenzow | 379/355 |
| 4,817,135 | 3/1989 | Winebaum et al. | 379/355 |
| 4,882,750 | 11/1989 | Henderson et al. | 379/355 |
| 4,980,910 | 12/1990 | Oba et al. | 379/355 |

*Primary Examiner*—James L. Dwyer
*Assistant Examiner*—Jacques M. Saint-Surin
*Attorney, Agent, or Firm*—Notaro & Michalos

[57] ABSTRACT

An autodialer with code feature, has a credit card sized carrier which contains; an audio transducer mounted to the carrier and activatable to produce tones that are comprehensible as discreet numerals and symbols by a touch-tone dialing system. A memory in the carrier stores a first sequence of numbers representing a telephone number and a second sequence of numbers representing a personal code. A control operatively connected to the memory and to the audio transducer, reads the first and second sequence of numbers and drives the audio transducer to generate tones corresponding to each number in each number sequence. A power supply mounted in the carrier is connected to the control, the memory and audio transducer for powering the control, memory and audio transducer. A first activator switch is connect to the control for controlling the control to read the first sequence of numbers only and generate tones in the audio transducer corresponding to the first sequence of numbers. A second activator switch spaced and separator from said first activator switch, is connected to the control for controlling the control to select the second sequence of numbers only and to activate the audio transducer according to the second sequence of numbers.

2 Claims, 4 Drawing Sheets

AUTODIALER WITH PIN FEATURE

FIELD AND BACKGROUND OF THE INVENTION

The present invention relates in general to an automatic dialing device, and in particular to a new and useful automatic dialing device which contains a pre-stored telephone number for dialing a special exchange, and a pre-stored PIN (Personal Identification Number) for use in accessing a credit account at the special exchange, in turn for charging telephone calls subsequently dialed by the user or dialed through the special exchange.

U.S. Pat. No. 4,706,275 discloses a telephone system utilizing a special exchange at which a credit account is opened containing a certain amount of prepaid credit, usable to make telephone calls.

A user of the system opens an account and deposits a certain amount of money in the account. When, at a remote location, the user wishes to use his or her account for making phone calls, the user calls the special exchange and uses a security code, for example a PIN or Personal Identification Number. Once the user's identity is established through the code, the user can make an outgoing telephone call to any desired location. The special exchange monitors the call and deducts ongoing amounts from the users account to pay for the call. If at any point the account is depleted, the call is immediately terminated. Otherwise at the end of the call a new balance remains to the user for making subsequent calls.

Credit cards having electronic features are also known. See for example U.S. Pat. No. 4,707,594 showing a self-contain consumer transaction card with keyboard, display and other features normally associated with calculator size structures.

A similar identification card is disclosed in U.S. Pat. No. 4,692,601.

Other patents are concerned with how active electronic elements can be fused or otherwise connected into a credit card size structure. See for example U.S. Pat. Nos. 5,026,452 and 4,966,857.

Also relevant in this field are U.S. Pat. Nos. 4,822,990, 5,066,047 and 5,166,501. Also see French patent reference 26 40 549 published Jun. 22, 1990.

Autodialing devices are also known. They are generally about the size of a calculator and include a tone generator, keyboard and internal storage means for storing different telephone numbers which can be called up and automatically dialed into a touch-tone telephone receiver, using the tone generator.

Currently, a common way of making a telephone call is to dial 0, followed by the number to be called, followed by a request from the telephone company for the user's credit card number, which is usually the user's telephone number followed by a four-digit PIN. The user then dials in his or her card number.

Since the advent of this technique, the theft of phone serves has been on the rise. Generally an unscrupulous observer will memorize the number sequence of a caller's credit card number and then use it to make unauthorized calls. For this reason many users have taken to carefully shielding their dialing operation at a touch-tone phone.

It is also common to come upon touch-tone phones which are not operating properly. Phones that operate on pulses rather than tones are also still wide spread in some parts of the country. Also, some phones in public places are connected to receiving incoming calls only and to preclude outgoing calls.

In all of these situations, security and dialing ability would be useful to the user.

SUMMARY OF THE INVENTION

The present invention is the subject of Disclosure Document No. 335226 filed Jul. 14, 1993.

The present invention relates to an improvement in telephonic communications. More particularly, the method and apparatus of the invention includes a credit card sized automatic phone dialer unit.

The card dialer is designed to audibly transmit pre-programmed information into the phone company's system. In this regard, the card possesses an audio transducer which is operably interconnected to a memory/control circuit unit. Any desired information may be programmed into such circuit by means of a programming connector. Such a connector is specifically designed to engage a program base unit. The memory circuit is powered by batteries. In a preferred embodiment of the invention, two 1.5 volt cells are utilized. The card further possesses a solar charging surface for augmenting the power of the batteries.

In operation, the preprogramming phone number of the special exchange is transmitted by means of the audio transducer when the card user presses a membrane switch. Once the system has been accessed, the user presses a second button or switch on the card which then transmits a credit card number, personal identification number (PIN), or the like.

Accordingly, an object of the present invention is to provide an autodialer with code feature, comprising: a credit card sized carrier; an audio transducer mounted to the carrier and activatable to produce tones that are comprehensible as discreet numerals and symbols by a touch-tone dialing system; memory means in said carrier for storing at least one first sequence of numbers representing a telephone number and at least one second sequence of numbers representing a personal code; control means operatively connected to the memory means and to the audio transducer for reading the first and second sequence of numbers and for driving the audio transducer to generate tones corresponding to each number in each number sequence; a power supply mounted in the carrier and connected to the control means, the memory means and the audio transducer for powering the control means, memory means and audio transducer; a first activator switch connected to the control means for controlling the control means to read said first sequence of numbers only, and generate tones in the audio transducer corresponding to the first sequence of numbers; and a second activator switch spaced and separator from the first activator switch, the second activator switch being connected to the control means for controlling the control means to select the second sequence of numbers only and to activate the audio transducer according to the second sequence of numbers.

A further object of the present invention is to provide a central programing station for programming a multiplicity of autodialer apparatuses each with a first sequence of numbers corresponding to the phone number of a special exchange and a second sequence of numbers each carrying a discreet and separate personal code for each individual autodialer.

A still further object of the present invention is to provide a method whereby a user carries an autodialer preprogrammed with the phone number of the special exchange and the persons personal code, so that the person can easily and discreetly dial the special exchange where his or her account is active, and thereafter press the second switch to input the personal code for actually accessing the account and making subsequent telephone calls.

In another embodiment of the invention, a keyboard and display are provided so that other often used numbers can be stored in addition to the special number and personal code.

By using the invention, security is maintained yet the person is not hampered by having to memorize both the special exchange number and the person's code.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
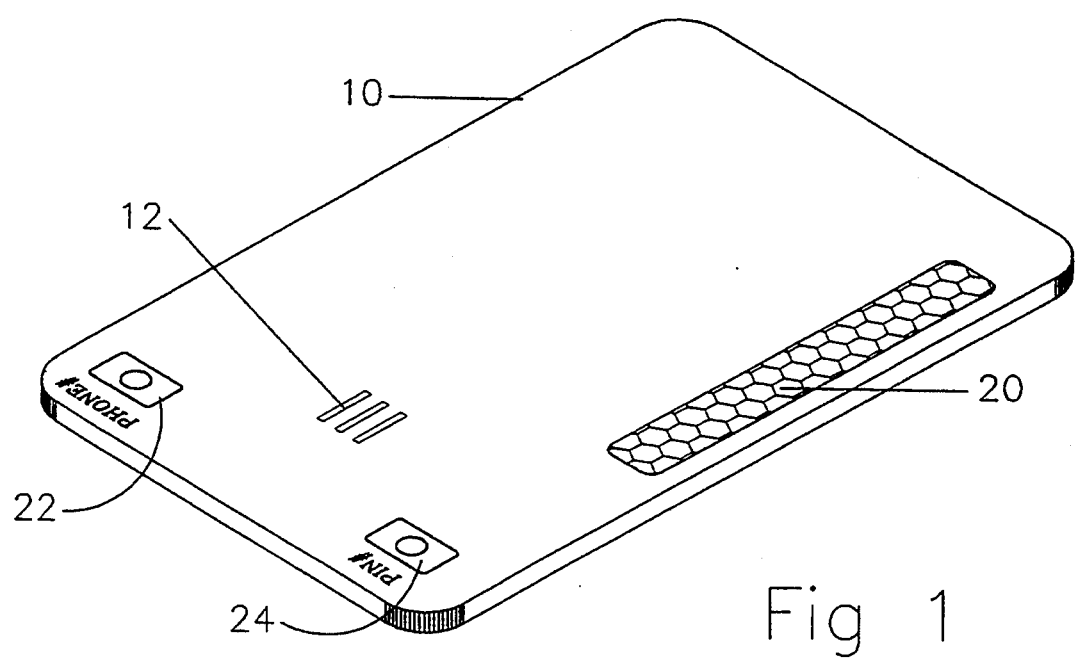
FIG. 1 is a perspective view of the autodialer according to the present invention.
Figure 2:
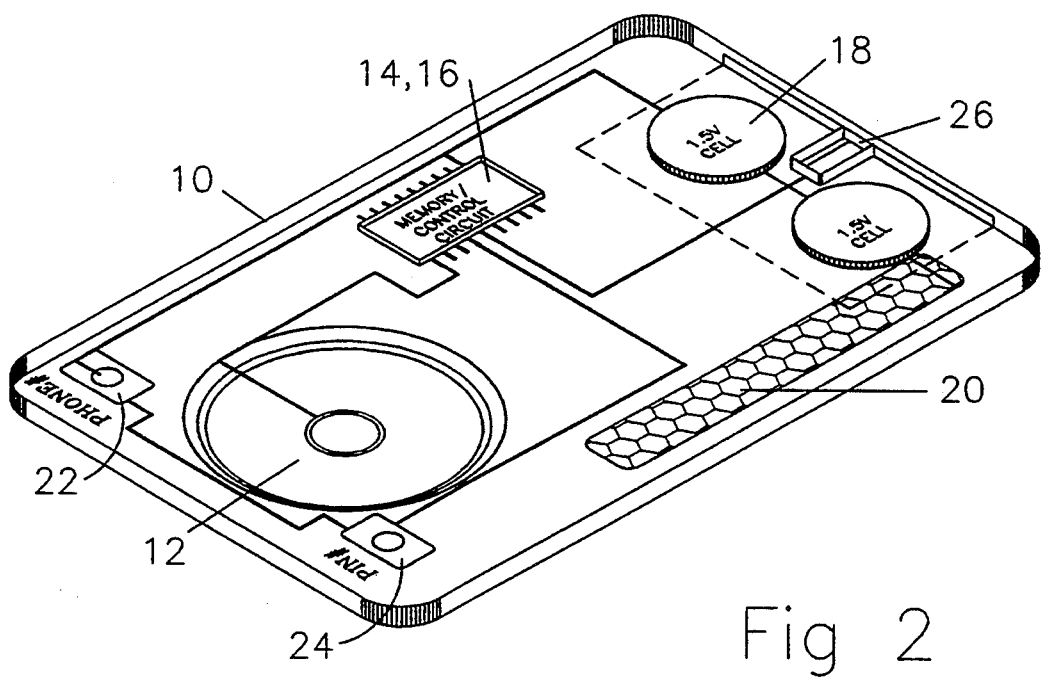
FIG. 2 is a perspective view showing the interior structure of the autodialer of FIG. 1.

Referring to the drawings in particular, the invention embodied in FIGS. 1 and 2 comprises a credit card sized carrier 10 which for example is approximately 0.1250 inches thick, 2.1260 inches high and 3.3750 inches across.

The autodialer of the present invention includes an internally mounted subminiature audio transducer 12, for example of the peso-electric type.

Carrier 10 also contains a memory/control circuit 14, 16 which is manufactured according to known integration techniques to contain a memory, for example an EPROM, which can be programmed, for example through an input port 26. The memory is programmed with a first sequence of numbers corresponding to the telephone number of a special telephone exchange, and also with a second sequence of numbers corresponding to the user's personal code. This may include numbers corresponding to the person's telephone number followed by a four-digit PIN, or to a credit card number or some combination of numbers which is unique to the user.

The control circuit is connected to both the memory and to the audio transducer and includes a tone generator of conventional design which is capable of generating twelve discreet tones corresponding to digits 0-9 and symbols #, *. These tones can be read by a conventional touch-tone dialing system of extremely well known design.

Power is supplied to the memory means, control means and audio transducer by a pair of button batteries 18, for example 1.5 volt batteries, and/or by a solar cell 20 which can be connected in series or parallel with the batteries.

A first activator switch in the form of a push-button membrane switch 22, is labeled "PHONE #, and is connected to the memory and control unit 14, 16. When pressed, only the first number sequence is accessed by control means 16 and corresponding tones generate at transducer 12. By holding the transducer 12 against the mouthpiece of a telephone, these tones automatically dial a number through the touch-tone dialing system. This is whether the telephone being used is otherwise operating with its own touch-tone key pad, as long as touch-tone dialing service is available.

Once the special exchange answers, the user can then press a second activator switch 24 which is also connected to the memory and control means 14, 16. This operates the control means 16 to access the second sequence of numbers only, which transmits the personal code to the service thus accessing the person's account. Thereafter, a telephone number can be dialed by the user or through the exchange.

Figure 3:
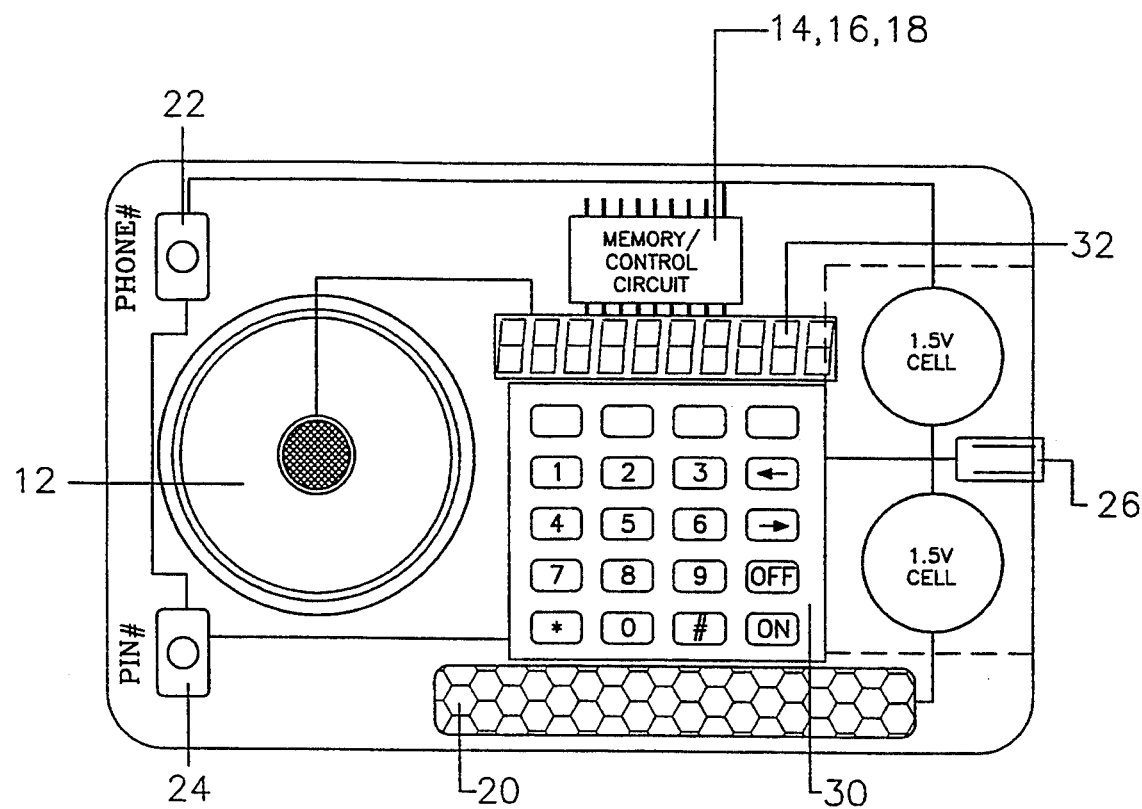
FIG. 3 is a top plan view of another embodiment of the invention with the cover removed to reveal internal structure.

In the embodiment of FIG. 3, the same reference numerals are utilized to designate the same or functionally similar parts whose function will not be repeated.

The embodiment of FIG. 3 includes however a miniaturized key pad 30 which is also connected to the memory and control means which incorporates a key pad reader and display generator 18 for reading numbers and symbols keyed in at the key pad 30 and for displaying numbers and symbols at a display 32. The display 32, keyboard 30 and circuitry needed to read and display symbols are well known.

Using the embodiment of FIG. 3, the card owner can input additional numbers and use the key pad to sequence through the numbers at display 32. The autodialer can then be used with switch 22 or another dialing switch, to dial any desired number displayed at display 32.

Figure 4:
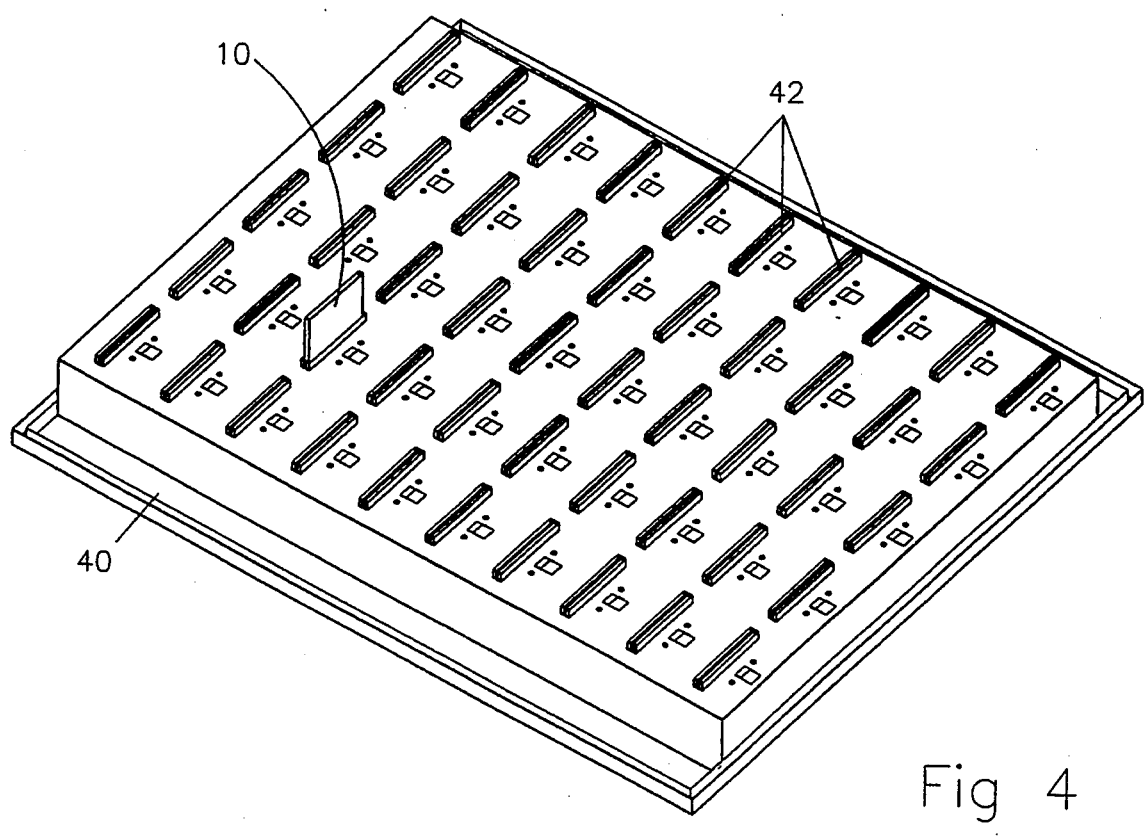
FIG. 4 is a perspective view of a central programming station used in accordance with the present invention.

To allow a special exchange to pre-program and distribute a multiplicity of autodialers 10 to a multiplicity of subscribers, a central programming station 40 shown in FIG. 4 can be provided with a multiplicity of slots 42 each containing an appropriate connection for connector 26, for example a so-called SCSI or Small Computer Serial Interface. Station 40 includes appropriate programming for storing the special exchange phone number as the first sequence of numbers in each of the memories 14 of each of the autodialers 10, and further scrolls through a multiplicity of unique personal codes for storing the second sequence of numbers in each memory, with each second sequence being different, from dialer to dialer.

While specific embodiments of the invention have been shown and described in detail to illustrate the application of the principles of the invention, it will be understood that the invention may be embodied otherwise without departing from such principles.

What is claimed is:

1. An autodialer assembly for accessing a special exchange comprising;
   a credit card sized carrier;
   an audio transducer mounted to the carrier and activatable to produce tones that are comprehensible as discreet numerals and symbols by a touch-tone dialing system;

memory means in said carrier for storing at least a first sequence of numbers representing a telephone number of a special exchange and a second sequence of numbers representing a personal code;

control means operatively connected to said memory means and to said audio transducer for reading said first and second sequence of numbers and for driving said audio transducer to generate tones corresponding to each number in each number sequence;

a power supply mounted in said carrier and connected to said control means, said memory means and said audio transducer for powering said control means, memory means and audio transducer;

a first activator switch connected to said control means for controlling said control means to read said first sequence of numbers only and generate tones in the audio transducer corresponding to the first sequence of numbers;

a second activator switch spaced and separator from said first activator switch, said second activator switch being connected to said control means for controlling the control means to select the second sequence of numbers only and to activate the audio transducer according to the second sequence of numbers;

a carrier connector connected to the memory and control means for programming the memory with the first and second sequence of numbers; and a central programming station including a multiplicity of station connectors each connectable to the carrier connector of a separate carrier for programming all of the memories with the same first sequence numbers corresponding to the telephone number of the special exchange, and with second sequences of numbers corresponding to unique personal codes each identifiable with a separate and distinct user having an account at the special exchange.

2. An assembly according to claim 1, wherein the power supply includes at least one battery and at least one photo cell.

* * * * *